US010989235B2

(12) United States Patent
Green et al.

(10) Patent No.: US 10,989,235 B2
(45) Date of Patent: Apr. 27, 2021

(54) INLET FLOW MEASUREMENT STRUCTURE FOR AN INDUSTRIAL GAS TURBINE

(71) Applicant: DOOSAN HEAVY INDUSTRIES & CONSTRUCTION CO., LTD., Changwon-si (KR)

(72) Inventors: Andrew Green, Palm Beach Gardens, FL (US); Matthew Montgomery, Jupiter, FL (US)

(*) Notice: Subject to any disclaimer, the term of this patent is extended or adjusted under 35 U.S.C. 154(b) by 71 days.

(21) Appl. No.: 16/240,025

(22) Filed: Jan. 4, 2019

(65) Prior Publication Data

US 2020/0217336 A1 Jul. 9, 2020

(51) Int. Cl.
*F15D 1/02* (2006.01)
*G01F 1/42* (2006.01)

(52) U.S. Cl.
CPC .............. *F15D 1/025* (2013.01); *G01F 1/42* (2013.01)

(58) Field of Classification Search
CPC .................................. F15D 1/025; G01F 1/42
USPC ...................... 138/39, 44, 111, 116
See application file for complete search history.

(56) References Cited

U.S. PATENT DOCUMENTS

| | | | | |
|---|---|---|---|---|
| 1,310,509 A * | 7/1919 | Specht | ...................... | D01D 4/02 425/464 |
| 1,559,156 A * | 10/1925 | Bullock | ..................... | G01F 1/42 73/861.61 |
| 2,074,690 A * | 3/1937 | Gerdts | ...................... | F16T 1/34 137/177 |
| 2,096,886 A * | 10/1937 | Dodd | ...................... | F23D 14/06 239/567 |
| 2,229,119 A * | 1/1941 | Nichols | ................... | F02B 33/00 181/275 |
| 2,325,036 A * | 7/1943 | Case | ....................... | F28F 1/006 165/147 |
| 2,714,503 A * | 8/1955 | Heisler | ................ | F02M 19/035 261/78.1 |
| 2,797,905 A * | 7/1957 | Olson | ...................... | F02M 1/00 261/41.1 |
| 2,924,441 A * | 2/1960 | Osborne, V | ............. | B01D 3/22 261/113 |
| 3,774,645 A * | 11/1973 | Pompa | .................... | F16L 55/00 138/44 |
| 4,487,366 A * | 12/1984 | Davis | .................... | H01S 3/0953 239/11 |
| 5,392,815 A | 2/1995 | Stuart | | |
| 5,495,872 A | 3/1996 | Gallagher et al. | | |
| 5,918,637 A * | 7/1999 | Fleischman | ............ | B01D 3/008 138/40 |

(Continued)

FOREIGN PATENT DOCUMENTS

KR  10-2014-0126269 A  10/2014
WO  2018/052588 A1  3/2018

*Primary Examiner* — James F Hook (57) ABSTRACT

An inlet flow structure can comprise: a plurality of bellmouth elements, each of the plurality of bellmouth elements including a bellmouth and a diffuser; a plurality of supply plenums, each of the plurality of supply plenums surrounding a respective one of the plurality of bellmouth elements, wherein the plurality of supply plenums are divided by a wall which provides equivalent air flow to each bellmouth element. The inlet flow structure comprises an inlet plenum disposed on the plurality of supply plenums and an outlet plenum disposed on the plurality of bellmouth elements.

18 Claims, 11 Drawing Sheets

(56) References Cited

U.S. PATENT DOCUMENTS 7,249,614 B2 7/2007 Vakili
2005/0205147 A1* 9/2005 Sawchuk ............... F15D 1/02
  138/39

* cited by examiner

Figure 1(a)

– Prior Art –

INLET FLOW MEASUREMENT STRUCTURE FOR AN INDUSTRIAL GAS TURBINE

BACKGROUND OF THE INVENTION

For a large Industrial Gas Turbine (IGT) test, it is sometimes necessary to accurately measure the air massflow into the engine. A bellmouth is a typical device for accurately measuring air massflow, however, due to limitations in manufacture and calibration, a single bellmouth is not practical. Therefore, a bellmouth array (due to the large flow for an IGT) is necessary. The intent of the bellmouth array is to provide an accurate air massflow measurement. The overall system performance can be compromised to meet the measurement accuracy goal. A bellmouth array has a unique system calibration due to their close proximity and mutual interaction which makes the system calibration not simply a sum of the individual bellmouths. A conventional bellmouth array would be calibrated as a system to compensate for the location in the array and the amount of flow interference from a neighboring bellmouth. Locating the bellmouth elements of the array further apart to minimize the interference would eliminate the need for a system calibration, but not practical on a large IGT due to geometric constraints and other size limitations.

A calibrated inlet bellmouth is a conventional way to measure mass flow. Manufacturing constraints limit the practical size of the bellmouth and lead to the use of bellmouth arrays for larger mass flow applications. While a single bellmouth intakes from an "infinite source" and can be calibrated accurately, the individual bellmouths in an array interact with each other, so the calibration is adversely affected. Extensive calibration for various flow rates is necessary, and increases the uncertainty in the flow measurement.

BRIEF SUMMARY OF THE INVENTION

The subject invention relates to an inlet flow structure, more particularly, to an inlet flow measurement structure for a large industrial gas turbine. Embodiments of the subject invention provide novel and advantageous inlet flow structures that comprise a plurality of bellmouth elements and a plurality of supply plenums surrounding the plurality of bellmouth elements and isolated from each other by a wall, thereby inhibiting mutual interference of the plurality of bellmouth elements and providing accurate flow measurement of the array by only fully calibrating a single bellmouth.

In an embodiment of the subject invention, an inlet flow structure can comprise: a plurality of bellmouth elements, each of the plurality of bellmouth elements including a bellmouth and a diffuser; and a plurality of supply plenums, each of the plurality of supply plenums surrounding a respective one of the plurality of bellmouth elements, wherein the plurality of supply plenums are divided by walls.

In another embodiment of the subject invention, an inlet flow structure can comprise: a first bellmouth element and a second bellmouth element; a first supply plenum surrounding the first bellmouth element; and a second supply plenum surrounding the second bellmouth element, wherein the first supply plenum and the second supply plenum are isolated from each other.

In yet another embodiment of the subject invention, an inlet flow structure can comprise: a plurality of bellmouth elements arranged in an array; and a side wall disposed between the plurality of bellmouth elements and forming a plurality of supply plenums arranged in the array such that each of the plurality of supply plenums surrounds a respective one of the of the plurality of bellmouth elements, wherein the plurality of supply plenums are isolated from each other by the side wall.

BRIEF DESCRIPTION OF THE DRAWINGS

FIG. 1 (a) shows a traditional inlet flow structure.

DETAILED DISCLOSURE OF THE INVENTION

When the terms "on" or "over" are used herein, when referring to layers, regions, patterns, or structures, it is understood that the layer, region, pattern, or structure can be directly on another layer or structure, or intervening layers, regions, patterns, or structures may also be present. When the terms "under" or "below" are used herein, when referring to layers, regions, patterns, or structures, it is understood that the layer, region, pattern, or structure can be directly under the other layer or structure, or intervening layers, regions, patterns, or structures may also be present. The terms "includes" and "including" are equivalent to "comprises" and "comprising", respectively.

In addition, references to "first", "second", and the like (e.g., first and second portion), as used herein, and unless otherwise specifically stated, are intended to identify a particular feature of which there may be more than one. Such reference to "first" does not imply that there must be two or more. These references are not intended to confer any order in time, structural orientation, or sidedness (e.g., left or right) with respect to a particular feature, unless explicitly stated. In addition, the terms "first" and "second" can be selectively or exchangeably used for the members.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, a dimension of each of the elements may be exaggerated for clarity of illustration, and the dimension of each of the elements may be different from an actual dimension of each of the elements. Not all elements illustrated in the drawings must be included and limited to the present disclosure, but the elements except essential features of the present disclosure may be added or deleted.

It is to be understood that the figures and descriptions of embodiments of the present invention have been simplified to illustrate elements that are relevant for a clear understanding of the invention, while eliminating (in certain cases), for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

Figure 1A:
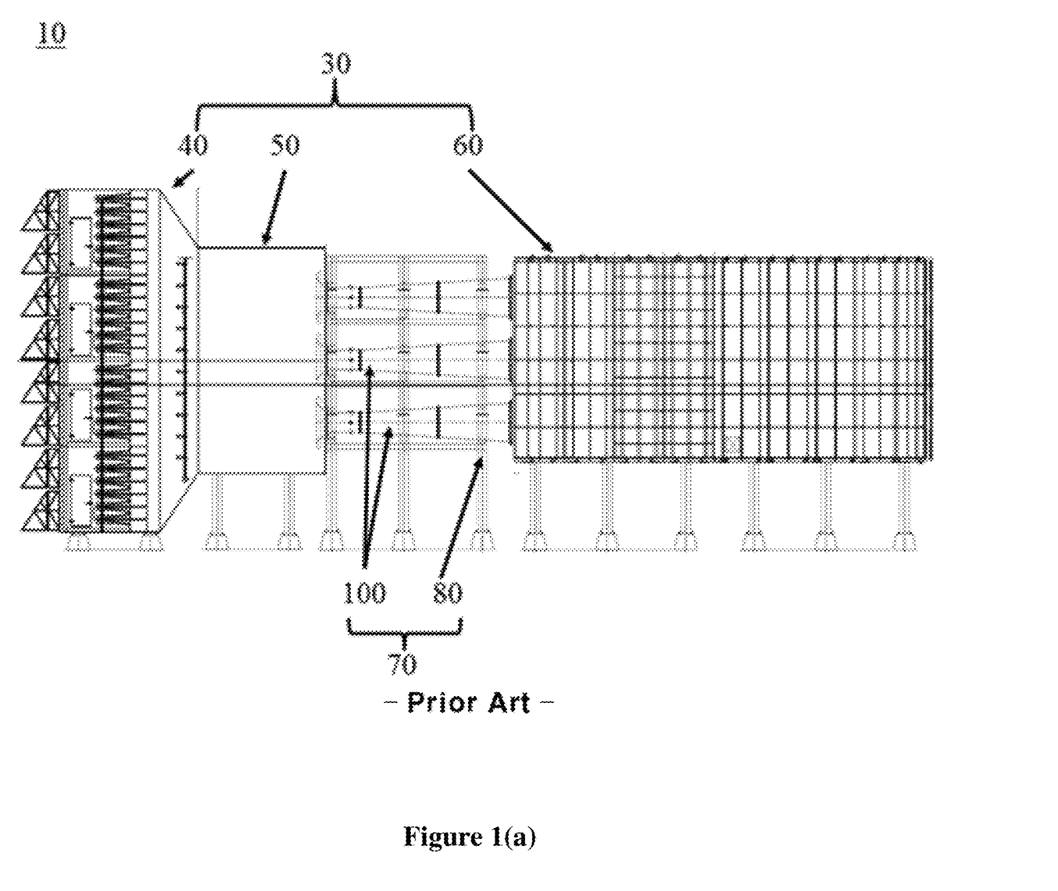

Reference will be made to the attached figures on which the same reference numerals are used throughout to indicate the same or similar components. FIG. 1(a) shows a traditional inlet flow structure. Referring to FIG. 1(a), an inlet flow structure 10 comprises an intake system 30 and a bellmouth system 70. In particular, the intake system 30 comprises an inlet plenum 40 receiving an air flow and an outlet plenum 60 discharging the air flow, and the bellmouth system 70 comprises a plurality of identical bellmouth elements 100. The inlet flow structure 10 further comprises a single supply plenum 50 between the inlet plenum 40 and the bellmouth system 70 and a frame 80 supporting the bellmouth system 70.

Figure 1B:
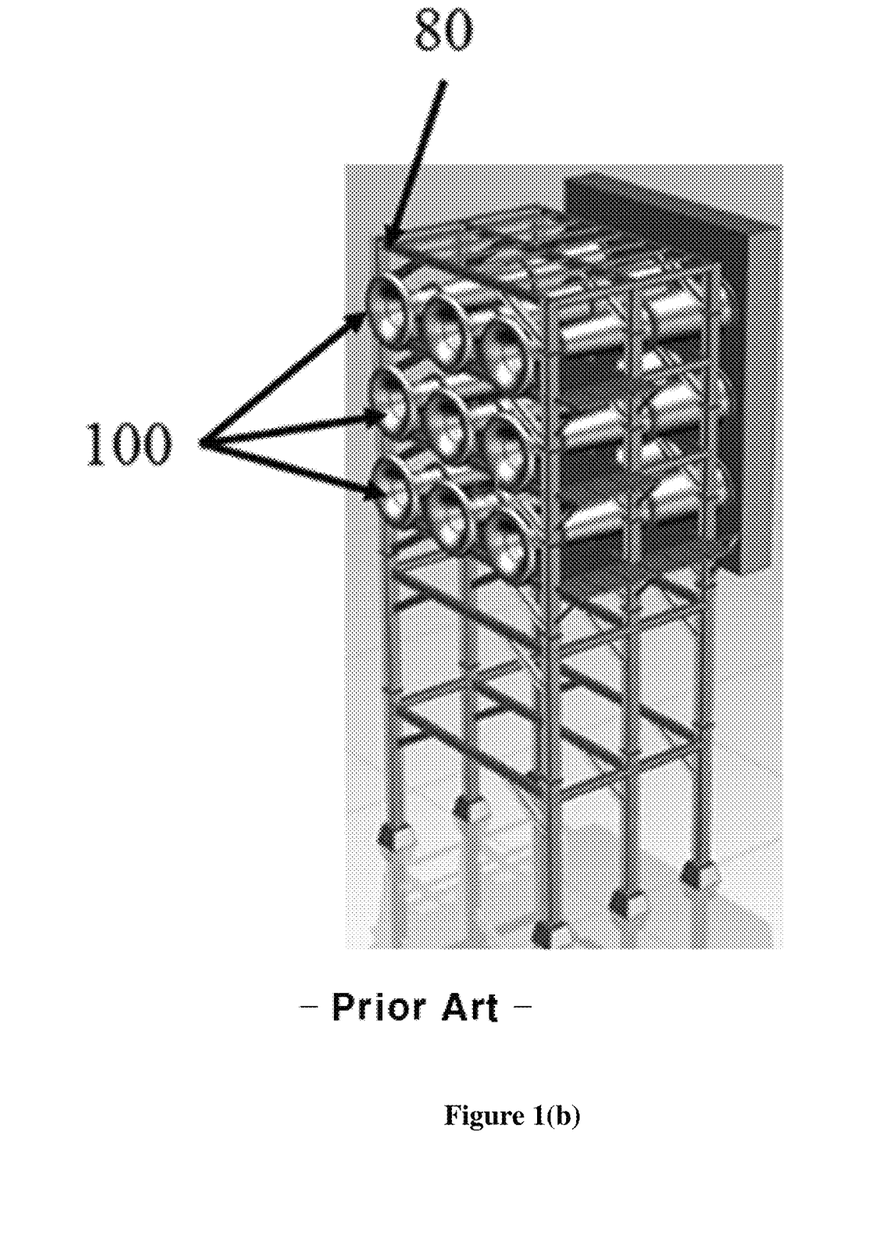
FIG. 1(b) shows a perspective view of a traditional inlet flow structure.
Figure 1C:
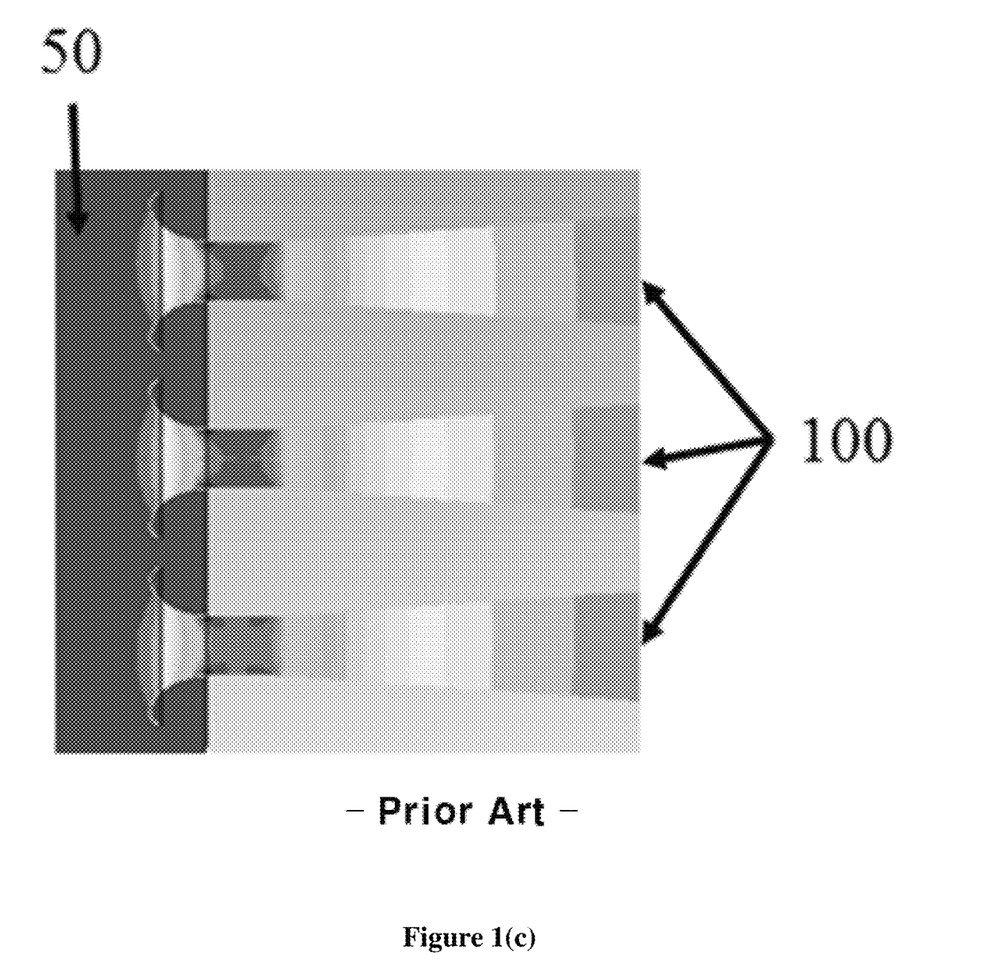
FIG. 1(c) shows a flow pressure field in a traditional inlet flow structure.

FIG. 1(b) shows a perspective view of a traditional inlet flow structure, and FIG. 1(c) shows a flow pressure field in a traditional inlet flow structure. Referring to FIGS. 1(a)-1(c), the flow pressure field in each of the plurality of bellmouth elements 100 is not similar to each other but much different from each other. The main reason is that the plurality of bellmouth elements 100 are in close proximity to each other; therefore the flow pressure field varies according to the location of each of the plurality of bellmouth elements 100.

By isolating the individual bellmouths in the array and calibrating each bellmouth for a confined space, only calibration of a single representative bellmouth is needed and the measurement accuracy of the array can be dramatically improved. That is, isolating the flow upstream of the individual bellmouths in the array by adding barriers between bellmouths will eliminate their mutual interference and so provide an accurate flow measurement with only a single element calibration.

Figure 2:
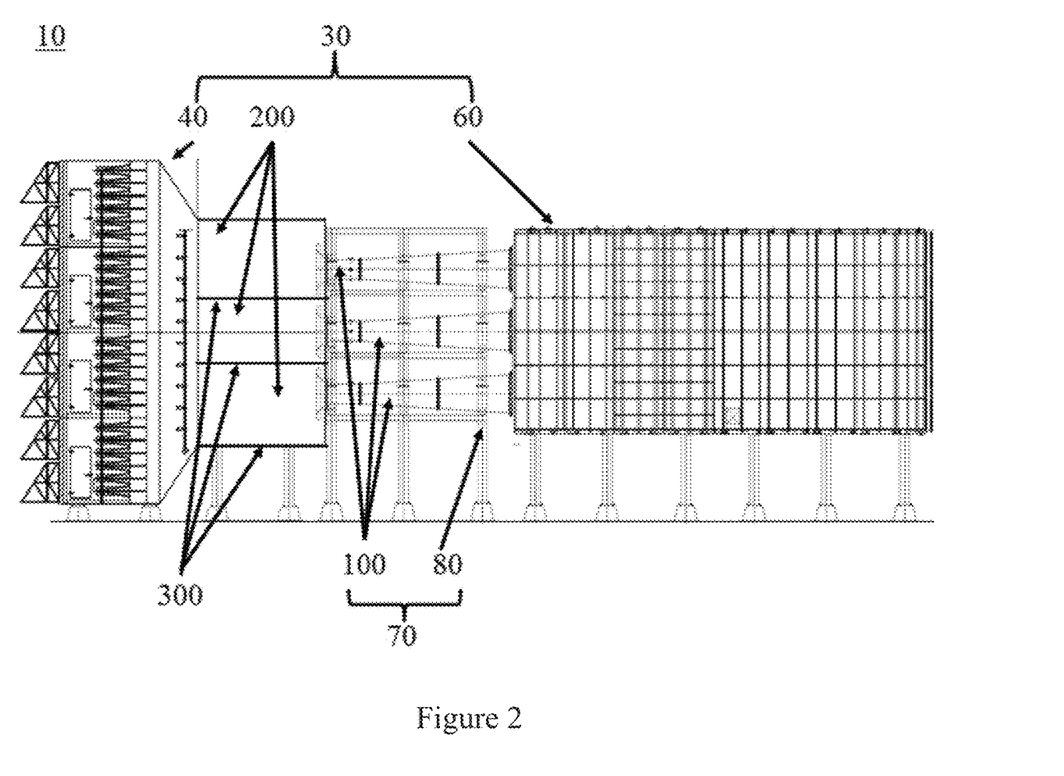
FIG. 2 shows an inlet flow structure according to an embodiment of the subject invention.

FIG. 2 shows an inlet flow structure according to an embodiment of the subject invention. Referring to FIG. 2, an inlet flow structure 10 according to a subject invention comprises an intake system 30 and a bellmouth system 70, and the intake system 30 comprises an inlet plenum 40 receiving an air flow and an outlet plenum 60 discharging the air flow. The bellmouth system 70 includes a plurality of bellmouth elements 100 and a frame 80 supporting the bellmouth system 70. The inlet flow structure 10 further comprises a plurality of supply plenums 200 between the inlet plenum 40 and the bellmouth system 70.

Each of the plurality of supply plenums 200 is divided by a wall 300; therefore isolated from each other by a wall 300. Each of the plurality of supply plenums 200 is configured to surround each of the plurality of bellmouth elements 100. Therefore, the air flow received from the inlet plenum 40 is separated by the each of the plurality of supply plenums 200, and the separated air flow is introduced equally to the each of plurality of bellmouth elements 100, thereby reducing interference in front of the each of plurality of bellmouth elements 100.

Figure 3A:
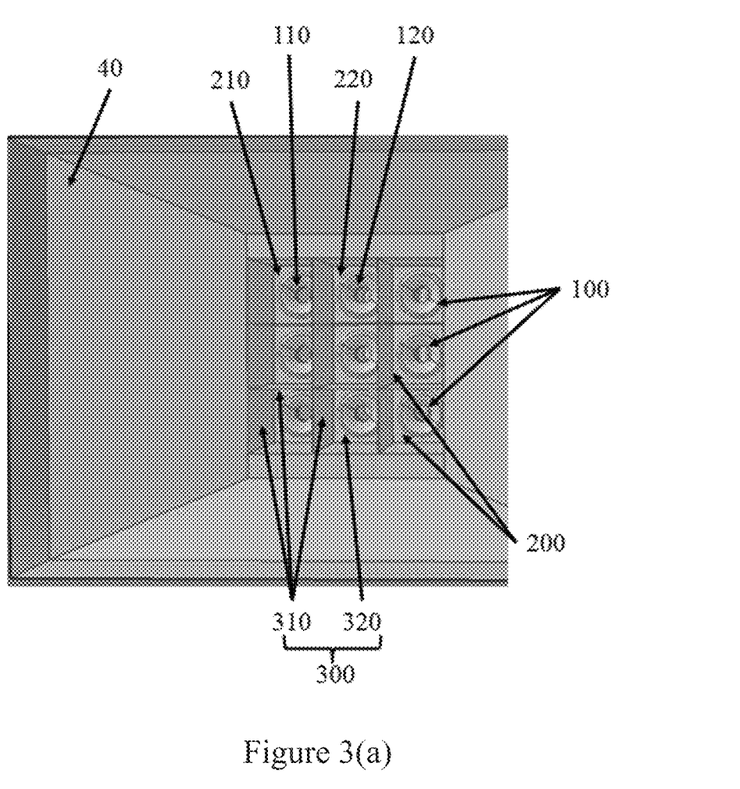
FIG. 3(a) shows a perspective view of an inlet flow structure according to an embodiment of the subject invention.
Figure 3B:
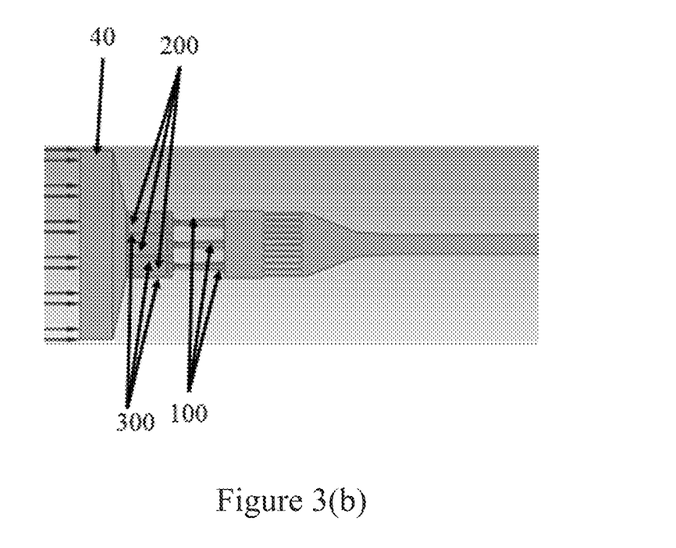
FIG. 3(b) shows a side view of an inlet flow structure according to an embodiment of the subject invention.

FIG. 3(a) shows a perspective view of an inlet flow structure according to an embodiment of the subject invention, and FIG. 3(b) shows a side view of an inlet flow structure according to an embodiment of the subject invention. Referring to FIGS. 3(a) and 3(b), the plurality of bellmouth elements 100 and the plurality of supply plenums 200 are arranged in an array, wherein each of plurality of supply plenums 200 corresponds to each of the plurality of bellmouth elements 100, and the plurality of supply plenums 200 are isolated from each other by the wall 300. The wall 300 comprises a side wall 310 and a back wall 320 disposed on the side wall 310. The side wall 310 divides the plurality of supply plenums 200 and surrounds each of the plurality of bellmouth elements 100. Each of the plurality of bellmouth elements 100 passes through the back wall 320.

A first supply plenum 210 of the plurality of supply plenums 200 surrounds a first bellmouth element 110 of the plurality of bellmouth elements 100, and a second supply plenum 220 of the plurality of supply plenums 200 surrounds a second bellmouth element 120 of the plurality of bellmouth elements 100. Even if an air flow is supplied from the inlet plenum 40 at the same time, the air flow is supplied to the first bellmouth element 110 and the second bellmouth element 120 through the first supply plenum 210 and the second supply plenum 220, respectively; therefore the air flow in front of the first bellmouth element 110 does not interact with the air flow in front of the second bellmouth element 120.

Figure 4A:
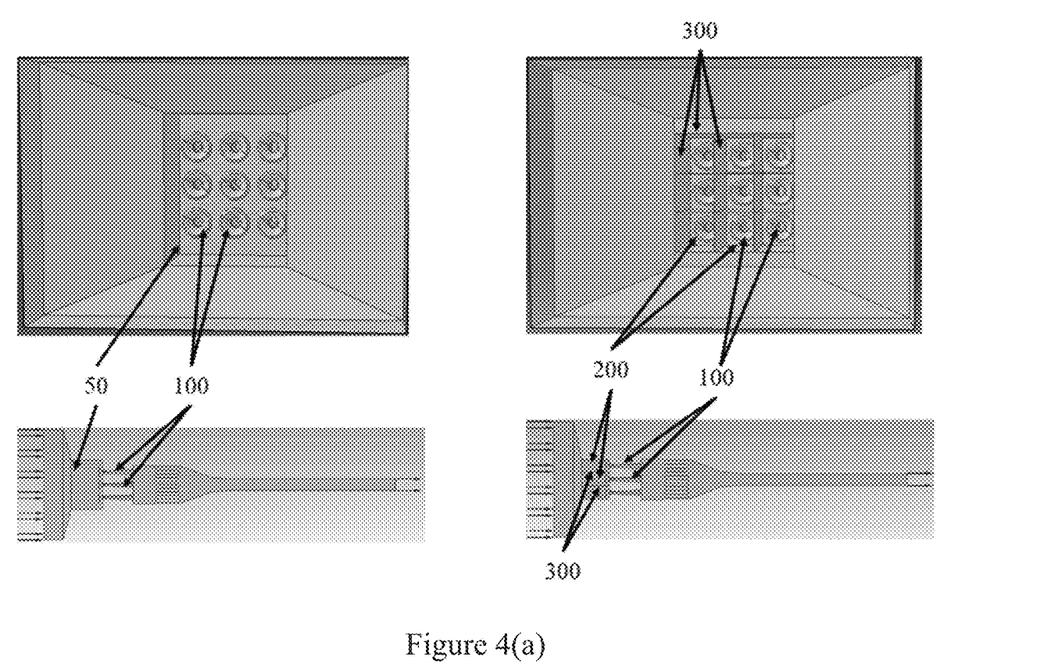
FIG. 4(a) shows a front comparison view of a traditional inlet flow structure and an inlet flow structure according to an embodiment of the subject invention.
Figure 4B:
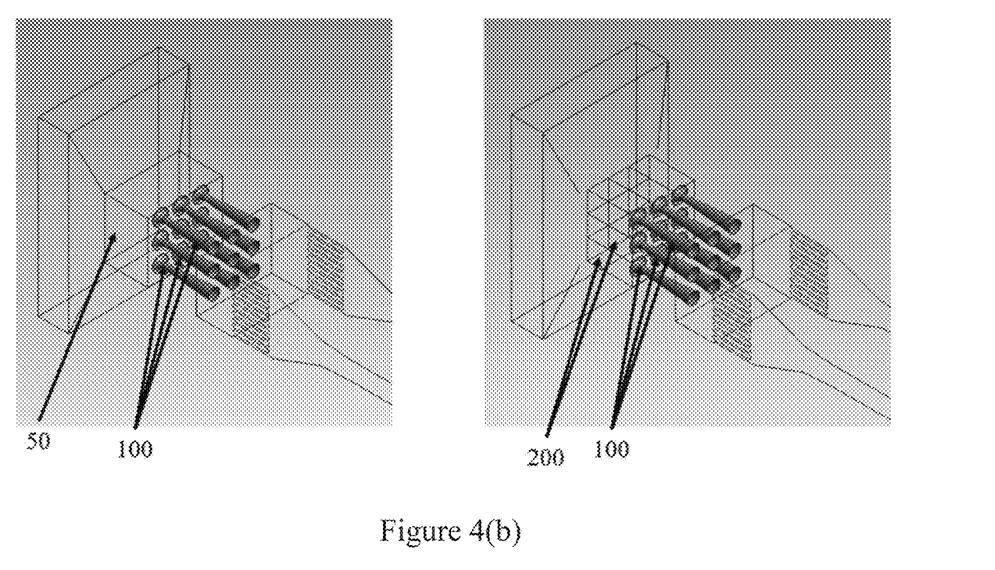
FIG. 4(b) shows a back comparison view of a traditional inlet flow structure and an inlet flow structure according to an embodiment of the subject invention.

FIG. 4(a) shows a front comparison view of a traditional inlet flow structure and an inlet flow structure according to an embodiment of the subject invention. FIG. 4(b) shows a back comparison view of a traditional inlet flow structure and an inlet flow structure according to an embodiment of the subject invention. Referring to FIGS. 4(a) and 4(b), while the plurality of bellmouth elements 100 in a traditional inlet flow structure receive an air flow through the single supply plenum 50, the plurality of bellmouth elements 100 in an inlet flow structure of the subject invention receive an air flow through each of the plurality of supply plenums 200. The plurality of supply plenums 200 are isolated from each other by the wall 300, thereby reducing interference and providing the same air flow to each of the bellmouth elements 100. That is, each of the plurality of bellmouth elements 100 is connected to only one supply plenum that is not shared with other bellmouth elements.

Figure 5A:
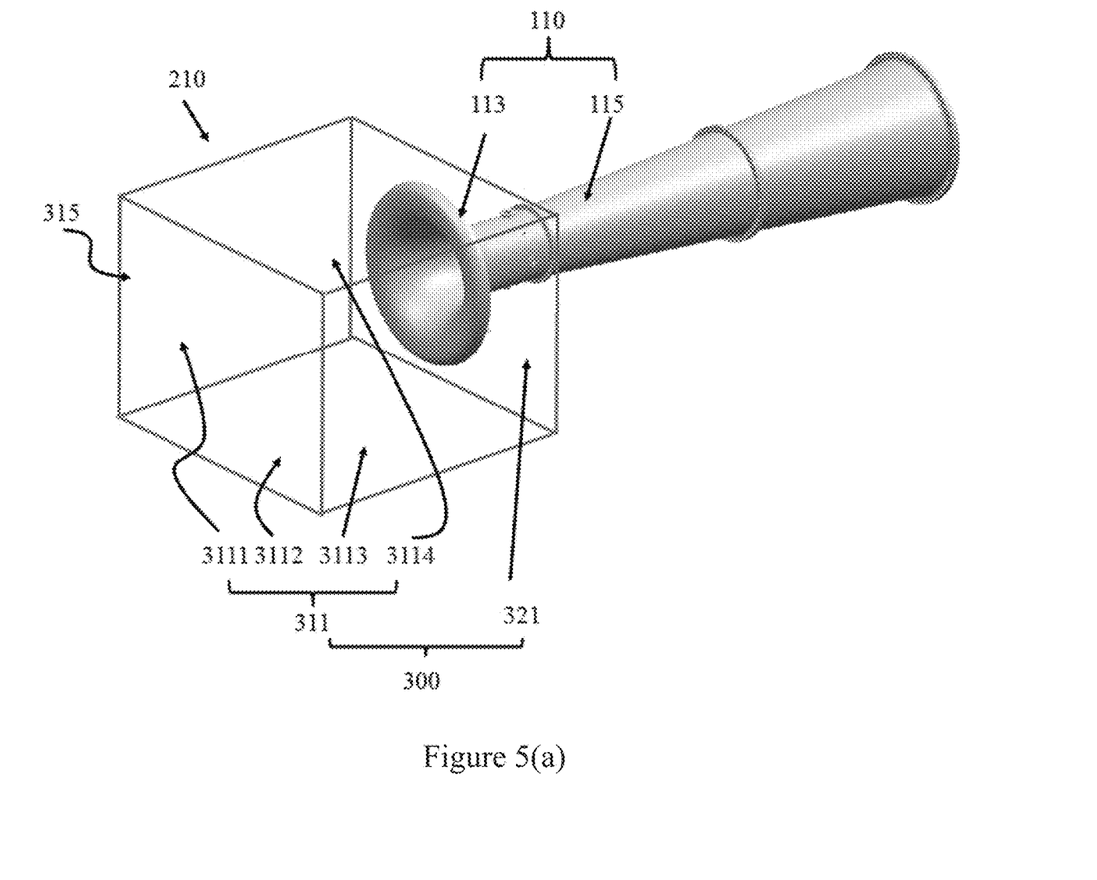
FIG. 5(a) shows a perspective view of a supply plenum and a bellmouth element of an inlet flow structure according to an embodiment of the subject invention.
Figure 5B:
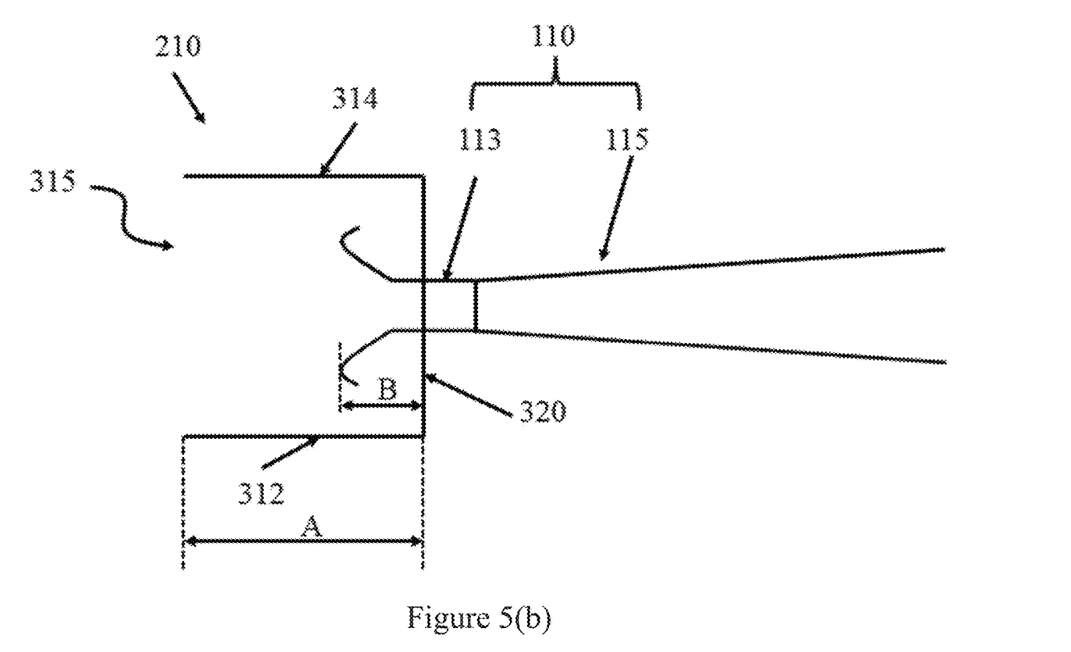
FIG. 5(b) shows a side view of a supply plenum and a bellmouth element of an inlet flow structure according to an embodiment of the subject invention.

FIG. 5(a) shows a perspective view of a supply plenum and a bellmouth element of an inlet flow structure according to an embodiment of the subject invention. FIG. 5(b) shows a side view of a supply plenum and a bellmouth element of an inlet flow structure according to an embodiment of the subject invention. FIGS. 5(a) and 5(b) show the first bellmouth element 110 and the first supply plenum 210 of FIG. 3(a). Referring to FIGS. 5(a) and 5(b), the first bellmouth element 110 comprises a first bellmouth 113 and a first diffuser 115 connected to the first bellmouth 113, wherein a part of the first bellmouth 113 is disposed inside the first supply plenum 210 and the first diffuser 115 is disposed outside the first supply plenum 210. The first bellmouth 113 and the first diffuser 115 are connected outside the first supply plenum 210.

The first supply plenum 210 comprises a first side wall 311 and a first back wall 321. The first supply plenum 210 can have, but is not limited to, a quadrangular prism shape including four lateral surfaces corresponding to the first side wall 311, a back surface corresponding to the first back wall 321, and a front surface 315. The four lateral surfaces are a first lateral surface 3111, a second lateral surface 3112, a third lateral surface 3113, and a fourth lateral surface 3114. The front surface 315 as an imaginary surface is open such that an air is supplied to the first supply plenum 210 through the front surface 315.

The first side wall 311 surrounds the first bellmouth 113 in the first supply plenum 210 such that a side length A of the first side wall from the first back wall 320 is larger than a distance B of the first bellmouth 113 from the first back wall 320 in the first supply plenum 210.

Figure 5C:
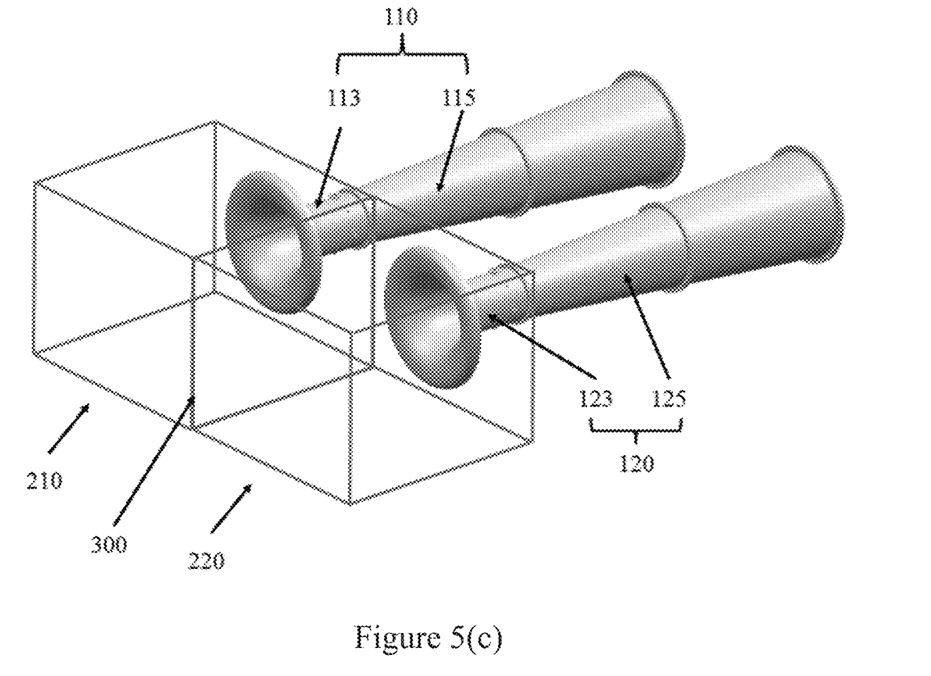
FIG. 5(c) shows a perspective view of two supply plenums and two bellmouth elements of an inlet flow structure according to an embodiment of the subject invention.

FIG. 5(c) shows a perspective view of two supply plenums and two bellmouth elements of an inlet flow structure according to an embodiment of the subject invention. Referring to FIG. 5(c), the second bellmouth element 120 comprises a second bellmouth 123 and a second diffuser 125 connected to the second bellmouth 123, and a part of the second bellmouth 123 is disposed inside the second supply plenum 220. Though the first bellmouth element 110 is disposed next to the second bellmouth element 120, the first bellmouth 113 and the second bellmouth 123 are disposed in the different supply plenums 210 and 220 that are divided and isolated by the wall 300.

Figure 6:
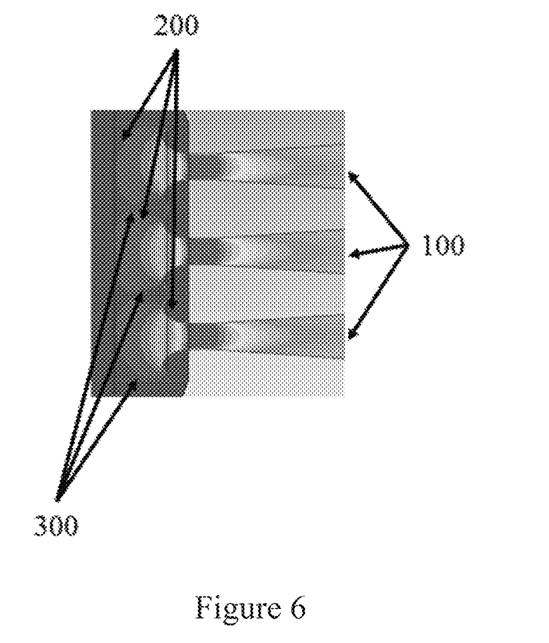
FIG. 6 shows a flow pressure field in an inlet flow structure according to an embodiment of the subject invention.

FIG. 6 shows a flow pressure field in an inlet flow structure according to an embodiment of the subject invention. Referring to FIG. 6, the flow pressure fields in the plurality of bellmouth elements 100 are similar to each other because the air flow is supplied to each of the plurality of bellmouth elements 100 through each of the plurality of supply plenums 200 isolated by the wall 300.

Figure 7A:
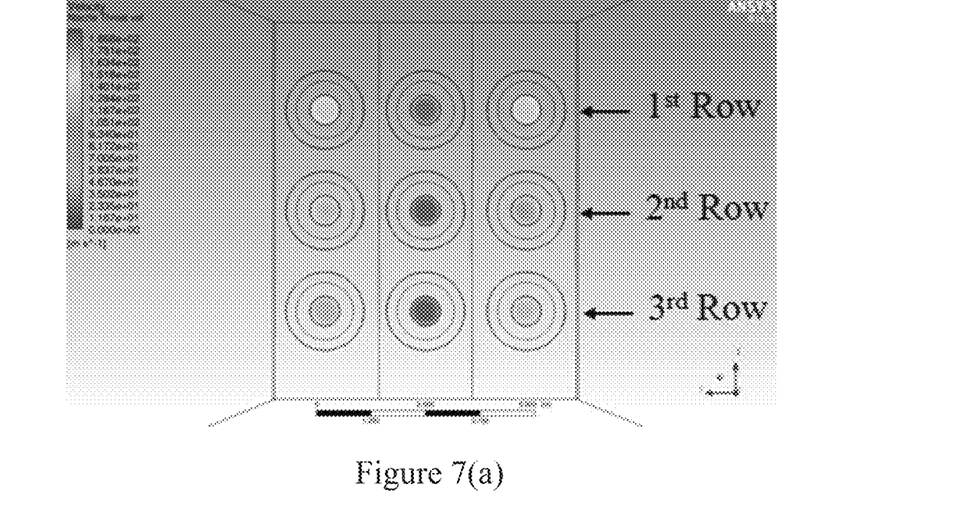
FIG. 7(a) shows a flow velocity distribution in a traditional inlet flow structure.
Figure 7B:
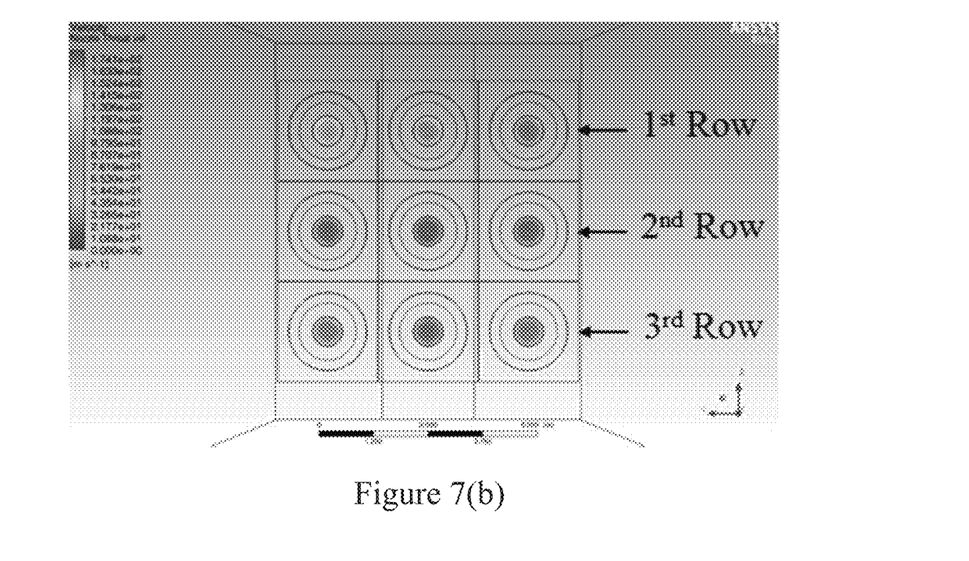
FIG. 7(b) shows a flow velocity distribution in an inlet flow structure according to an embodiment of the subject invention.

FIG. 7(a) shows a flow velocity distribution in a traditional inlet flow structure. FIG. 7(b) shows a flow velocity distribution in an inlet flow structure according to an embodiment of the subject invention. Referring to FIGS. 7(a) and 7(b), while flow velocity of the plurality of bellmouth elements in a traditional inlet flow structure changes according to the location in each rows of an array, flow velocity of the plurality of bellmouth elements in an inlet flow structure according to an embodiment of the subject invention is substantially more uniform based on the location. That is, the flow velocity of the plurality of bellmouth elements is similar to each other regardless the location.

Figure 8A:
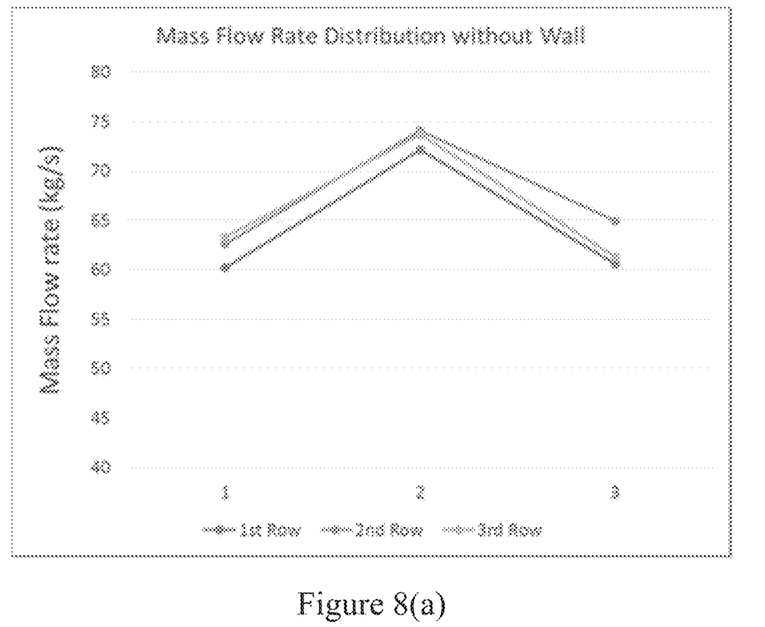
FIG. 8(a) shows a mass flow rate distribution in a close-packed bellmouth array structure.
Figure 8B:
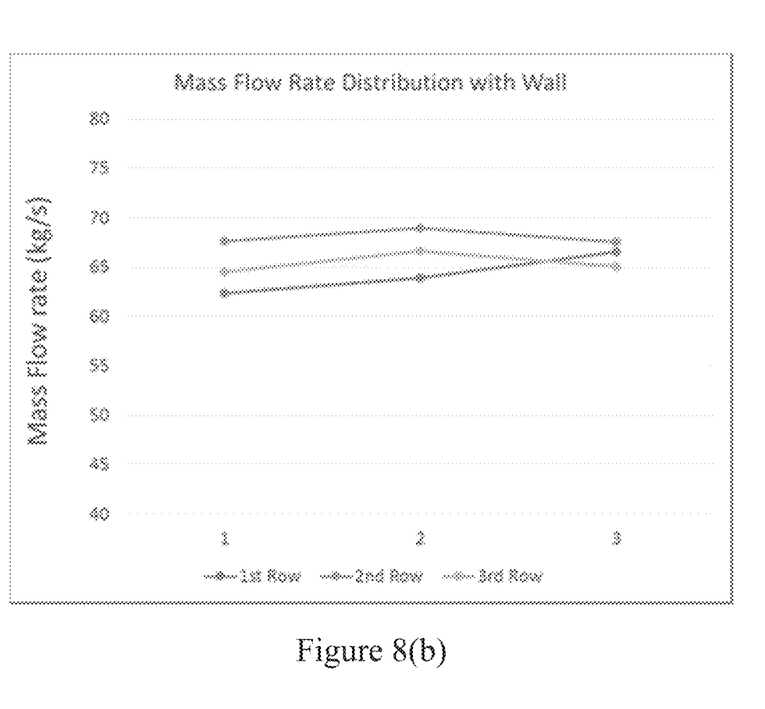
FIG. 8(b) shows a mass flow rate distribution in an inlet flow structure according to an embodiment of the subject invention.

FIG. 8(a) shows a mass flow rate distribution in a close-packed bellmouth array structure. FIG. 8(b) shows a mass flow rate distribution in an inlet flow structure according to an embodiment of the subject invention. Referring to FIG. 8(a), the mass flow rate severely changes based on the location such that the standard deviation of the mass flow rate is large (e.g., 5.44%). By contrast, the mass flow rate in an inlet flow structure according to an embodiment of the subject invention is almost constant such that the standard deviation of the mass flow rate is small (e.g., 1.97%).

The subject invention includes, but is not limited to, the following exemplified embodiments.

Embodiment 1

An inlet flow structure, comprising:
a plurality of bellmouth elements, each of the plurality of bellmouth elements including a bellmouth and a diffuser; and
a plurality of supply plenums, each of the plurality of supply plenums surrounding a respective one of the plurality of bellmouth elements,
wherein the plurality of supply plenums are divided by a wall.

Embodiment 2

The inlet flow structure according to embodiment 1, wherein the bellmouth is disposed inside the plurality of supply plenums.

Embodiment 3

The inlet flow structure according to any of embodiments 1-2, wherein the wall comprises a side wall and a back wall.

Embodiment 4

The inlet flow structure according to embodiment 3, wherein the side wall surrounds the bellmouth of the each of the plurality of bellmouth elements and the each of the plurality of bellmouth elements passes through the back wall.

Embodiment 5

The inlet flow structure according to any of embodiments 3-4, wherein a side length of the side wall from the back wall is larger than a distance of the bellmouth in the plurality of supply plenums from the back wall.

Embodiment 6

The inlet flow structure according to any of embodiments 1-5, further comprising an inlet plenum disposed on the plurality of supply plenums and an outlet plenum disposed on the diffuser of the plurality of bellmouth elements.

Embodiment 7

The inlet flow structure according to any of embodiments 1-6, wherein the plurality of bellmouth elements are spaced apart from each other.

Embodiment 8

The inlet flow structure according to any of embodiments 3-7, wherein the plurality of supply plenums are arranged such that adjacent two supply plenums are isolated by a same part of the side wall.

Embodiment 9

An inlet flow structure, comprising:
a first bellmouth element and a second bellmouth element;

a first supply plenum surrounding the first bellmouth element; and a second supply plenum surrounding the second bellmouth element, wherein the first supply plenum and the second supply plenum are isolated from each other.

Embodiment 10

The inlet flow structure according to embodiment 9, wherein the first the first bellmouth element comprises a first bellmouth and a first diffuser, the second bellmouth element comprises a second bellmouth and a second diffuser, a part of the first bellmouth is located inside the first supply plenum, and a part of the second bellmouth is located inside the second supply plenum.

Embodiment 11

The inlet flow structure according to embodiment 10, wherein the first bellmouth and the first diffuser are connected to each other, and the second bellmouth and the second diffuser are connected to each other.

Embodiment 12

The inlet flow structure according to any of embodiments 10-11, wherein the first supply plenum comprises a first side wall surrounding the part of the first bellmouth and a first back wall disposed on the first side wall, and the first bellmouth passes through the first back wall.

Embodiment 13

The inlet flow structure according to embodiment 12, wherein a side length of the first side wall from the first back wall is larger than a distance of the part of the first bellmouth in the first supply plenum from the first back wall.

Embodiment 14

The inlet flow structure according to any of embodiments 12-13, wherein the first supply plenum has a quadrangular prism including four lateral surfaces corresponding to the first side wall and a back surface corresponding to the first back wall.

Embodiment 15

The inlet flow structure according to any of embodiments 9-14, further comprising an inlet plenum disposed on the first supply plenum and the second supply plenum, and an outlet plenum disposed on the first diffuser and the second diffuser.

Embodiment 16

An inlet flow structure, comprising:
a plurality of bellmouth elements arranged in an array; and
a side wall disposed between the plurality of bellmouth elements and forming a plurality of supply plenums arranged in the array such that each of the plurality of supply plenums surrounds a respective one of the of the plurality of bellmouth elements, wherein the plurality of supply plenums are isolated from each other by the side wall.

Embodiment 17

The inlet flow structure according to embodiment 16, further comprising a back wall disposed on the side wall, wherein the each of the plurality of bellmouth elements passes through the back wall.

Embodiment 18

The inlet flow structure according to embodiment 17, wherein a side length of the side wall from the back wall is larger than a distance of the each of the plurality of bellmouth elements in the plurality of supply plenums from the back wall.

Embodiment 19

The inlet flow structure according to any of embodiments 16-18, further comprising a frame forming the array and supporting the plurality of bellmouth elements.

Embodiment 20

The inlet flow structure according to any of embodiments 16-19, further comprising an inlet plenum disposed on the plurality of supply plenums, and an outlet plenum disposed on the plurality of bellmouth elements.

Embodiment 21

An inlet flow structure, comprising:
a plurality of bellmouth elements; and
a plurality of supply plenums, each of the plurality of supply plenums surrounding a respective one of the plurality of bellmouth elements.

Embodiment 22

The inlet flow structure according to embodiment 21, wherein each of the plurality of bellmouth elements comprises a bellmouth and a diffuser.

Embodiment 23

The inlet flow structure according to embodiment 22, wherein the diffuser has a conical shape.

Embodiment 24

The inlet flow structure according to any of embodiments 22-23, wherein the bellmouth is disposed inside the plurality of supply plenums and the diffuser is disposed outside the plurality of supply plenums.

Embodiment 25

The inlet flow structure according to any of embodiments 21-24, wherein the plurality of supply plenums comprises a side wall surrounding the bellmouth and a back wall disposed on the side wall.

Embodiment 26

The inlet flow structure according to embodiment 25, wherein the each of the plurality of bellmouth elements passes through the back wall.

Embodiment 27

The inlet flow structure according to any of embodiments 21-26, further comprising an inlet plenum disposed on the plurality of supply plenums and an outlet plenum disposed on the plurality of bellmouth elements.

Embodiment 28

The inlet flow structure according to any of embodiments 25-27, wherein the plurality of supply plenums are arranged such that adjacent two supply plenums are isolated by a same part of the side wall.

Embodiment 29

The inlet flow structure according to any of embodiments 21-28, wherein the plurality of supply plenums are isolated from each other.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

What is claimed is:

1. An inlet flow structure for measuring air massflow, comprising:
   a plurality of bellmouth elements arranged in an array, each of the plurality of bellmouth elements including a bellmouth and a diffuser; and
   a plurality of supply plenums, each of the plurality of supply plenums enclosing the bellmouth of a corresponding bellmouth element of the plurality of bellmouth elements,
   wherein the plurality of supply plenums are divided by a wall configured to isolate from each other airflows that are upstream of the plurality of bellmouth elements, the wall comprising a side wall that extends in an axial direction of the plurality of supply plenums and a back wall that extends in a radial direction of the plurality of supply plenums, each of the plurality of supply plenums having a quadrangular prism shape formed by
      four lateral surfaces that correspond to the side wall, each of the four lateral surfaces having a first end and a second end opposite to the first end,
      a back surface that is formed at the first end of each of the four lateral surfaces and corresponds to the back wall, and
      an imaginary front surface that occurs at the second end of each of the four lateral surfaces and is open to receive the airflows that are upstream of the plurality of bellmouth elements so that each of the plurality of supply plenums exhibits substantially identical air massflow measurements of flow pressure field, flow velocity, and mass flow rate.

2. The inlet flow structure according to claim 1, wherein the corresponding bellmouth element extends axially into a corresponding supply plenum of the plurality of supply plenums.

3. The inlet flow structure according to claim 1,
   wherein the side wall surrounds an outer perimeter of the bellmouth of the each of the plurality of bellmouth elements, and
   wherein each of the plurality of bellmouth elements passes through the back wall.

4. The inlet flow structure according to claim 1, wherein a side length of the side wall from the back wall is larger than a distance of the bellmouth in the plurality of supply plenums from the back wall.

5. The inlet flow structure according to claim 4, further comprising
   an inlet plenum disposed on the plurality of supply plenums and
   an outlet plenum disposed on the diffuser of the plurality of bellmouth elements.

6. The inlet flow structure according to claim 1, wherein the plurality of bellmouth elements are spaced apart from each other.

7. The inlet flow structure according to claim 6, wherein the plurality of supply plenums are arranged such that adjacent two supply plenums are isolated by a same part of the side wall.

8. An inlet flow structure for measuring air massflow, comprising:
   a first bellmouth element and a second bellmouth element arranged in an array;
   a first supply plenum surrounding a portion of the first bellmouth element; and
   a second supply plenum surrounding a portion of the second bellmouth element,
   wherein the first supply plenum and the second supply plenum are isolated from each other by a wall configured to isolate from each other airflows that are upstream of the first bellmouth element and the second bellmouth element, the wall comprising a side wall that extends in an axial direction of the first and second supply plenums and a back wall that extends in a radial direction of the first and second supply plenums, each of the first and second supply plenums having a quadrangular prism shape formed by
      four lateral surfaces that correspond to the side wall, each of the four lateral surfaces having a first end and a second end opposite to the first end,
      a back surface that is formed at the first end of each of the four lateral surfaces and corresponds to the back wall, and
      an imaginary front surface that occurs at the second end of each of the four lateral surfaces and is open to receive the airflows that are upstream of the plurality of bellmouth elements so that each of the plurality of supply plenums exhibits substantially identical air massflow measurements of flow pressure field, flow velocity, and mass flow rate.

9. The inlet flow structure according to claim 8,
   wherein the first bellmouth element comprises a first bellmouth and a first diffuser, the first bellmouth located inside the first supply plenum; and
   wherein the second bellmouth element comprises a second bellmouth and a second diffuser, the second bellmouth located inside the second supply plenum.

10. The inlet flow structure according to claim 9, wherein
the first bellmouth and the first diffuser are connected to each other, and
the second bellmouth and the second diffuser are connected to each other.

11. The inlet flow structure according to claim 9,
wherein the first supply plenum comprises a first side wall enclosing the first bellmouth and a first back wall disposed on the first side wall, and
wherein the first bellmouth passes through the first back wall.

12. The inlet flow structure according to claim 11, wherein a side length of the first side wall from the first back wall is larger than a distance of the first bellmouth in the first supply plenum from the first back wall.

13. The inlet flow structure according to claim 12, further comprising
an inlet plenum disposed on the first supply plenum and the second supply plenum, and
an outlet plenum disposed on the first diffuser and the second diffuser.

14. An inlet flow structure for measuring air massflow, comprising:
a plurality of bellmouth elements arranged in an array; and
a side wall disposed between the plurality of bellmouth elements and forming a plurality of supply plenums arranged in the array such that each of the plurality of supply plenums surrounds a portion of a corresponding bellmouth element of the plurality of bellmouth elements, the side wall extending in an axial direction of the plurality of supply plenums and connecting to a back wall that extends in a radial direction of the plurality of supply plenums,
wherein the plurality of supply plenums are isolated from each other by the side wall,
wherein the side wall is configured to isolate from each other airflows that are upstream of the plurality of bellmouth elements, and
wherein each of the plurality of supply plenums has a quadrangular prism shape formed by
four lateral surfaces that correspond to the side wall, each of the four lateral surfaces having a first end and a second end opposite to the first end,
a back surface that is formed at the first end of each of the four lateral surfaces and corresponds to the back wall, and
an imaginary front surface that occurs at the second end of each of the four lateral surfaces and is open to receive the airflows that are upstream of the plurality of bellmouth elements so that each of the plurality of supply plenums exhibits substantially identical air massflow measurements of flow pressure field, flow velocity, and mass flow rate.

15. The inlet flow structure according to claim 14, wherein the each of the plurality of bellmouth elements passes through the back wall.

16. The inlet flow structure according to claim 15, wherein a side length of the side wall from the back wall is larger than a distance of the each of the plurality of bellmouth elements in the plurality of supply plenums from the back wall.

17. The inlet flow structure according to claim 16, further comprising a frame forming the array and supporting the plurality of bellmouth elements.

18. The inlet flow structure according to claim 17, further comprising
an inlet plenum disposed on the plurality of supply plenums, and
an outlet plenum disposed on the plurality of bellmouth elements.

* * * * *